United States Patent [19]

Fukuda et al.

[11] 4,118,196

[45] Oct. 3, 1978

[54] APPARATUS FOR CALCINING WET POWDERY GYPSUM

[75] Inventors: Yoshiharu Fukuda; Kazumasa Ohtani, both of Tokyo; Tossio R. Onissi, Koshigaya; Akitoshi Takeuchi, Funabashi, all of Japan

[73] Assignee: Onoda Cement Company, Limited, Japan

[21] Appl. No.: 369,570

[22] Filed: Jun. 13, 1973

[51] Int. Cl.$^2$ .......................... B01J 6/00; F27B 15/00
[52] U.S. Cl. .................................. 422/232; 34/57 A; 432/58; 422/233
[58] Field of Search ................ 23/262, 284; 34/57 A, 34/10; 432/15, 58

[56] References Cited

U.S. PATENT DOCUMENTS

| | | | |
|---|---|---|---|
| 2,621,034 | 12/1952 | Stecker | 432/58 |
| 3,066,017 | 11/1962 | Jahnig | 34/57 A X |
| 3,093,450 | 6/1963 | Luerssen et al. | 34/57 A X |
| 3,117,064 | 1/1964 | Friedrich | 432/15 X |
| 3,118,658 | 1/1964 | Dennert | 432/58 |
| 3,192,018 | 6/1965 | Minami | 23/262 |
| 3,412,898 | 11/1968 | Marynowski | 34/57 A |
| 3,436,837 | 4/1969 | Abelow et al. | 34/57 A X |
| 3,595,542 | 7/1971 | Ashman | 432/15 |
| 3,605,276 | 9/1971 | Enders | 34/57 A |
| 3,793,740 | 2/1974 | Ganiaris | 34/10 |
| 3,834,860 | 9/1974 | Fukuda et al. | 432/15 X |
| 3,839,802 | 10/1974 | Saito et al. | 34/10 |

*Primary Examiner*—Morris O. Wolk
*Assistant Examiner*—Arnold Turk

*Attorney, Agent, or Firm*—Robert E. Burns; Emmanuel J. Lobato; Bruce L. Adams

[57] ABSTRACT

Apparatus for calcining wet powdery gypsum which comprises:

(A) a furnace which generates a hot gas having a temperature higher than 900° C;

(B) a straight cylindrical hot gas supply pipe connected with the gas outlet of said furnace and having a tapered upper portion;

(C) a straight cylindrical high stream velocity pipe connected with the tapered portion of said hot gas supply pipe;

(D) a vortex chamber connected with the upper part of said high stream velocity pipe, which has a diameter bigger than that of said high stream velocity pipe and has tapered portions both at the gas inlet and outlet;

(E) a wet powdery gypsum supply pipe connected with the side wall of said vortex chamber, said gypsum supply pipe being connected in such a way that a projected extension of the lower edge of said gypsum supply pipe, following the same angle as that pipe, would intersect the center axis of said vortex chamber at a point higher than the bottom of said vortex chamber and lower than ½ H from the bottom of said vortex chamber;

(F) a heat transmission pipe connected with the gas outlet of said vortex chamber; and (G) a collector connected with said heat transmission pipe. This apparatus produces calcined homogeneous gypsum.

3 Claims, 3 Drawing Figures

FIG. 1
FIG. 2
FIG. 3
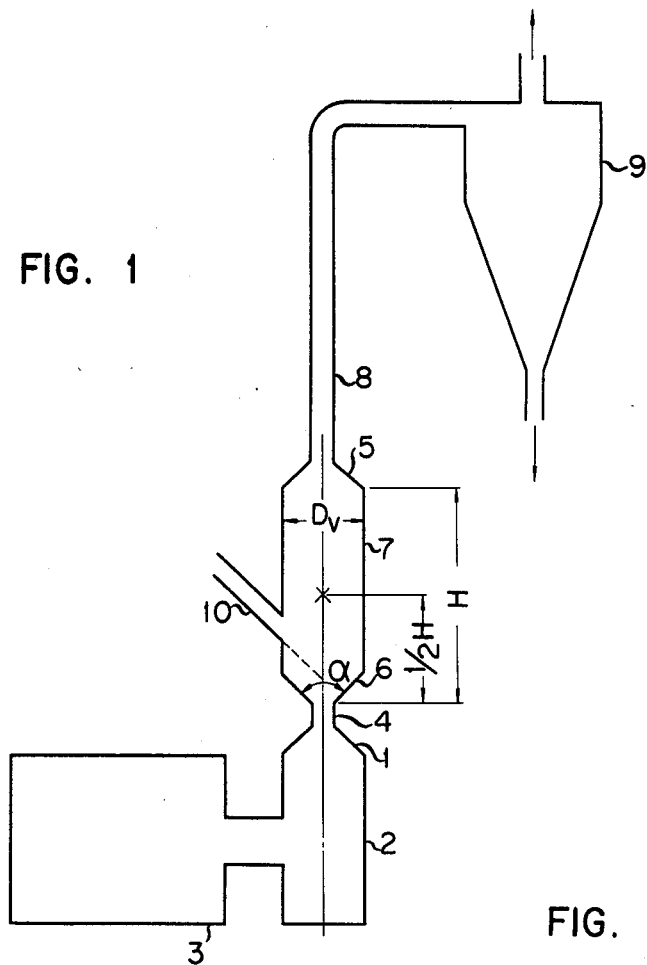
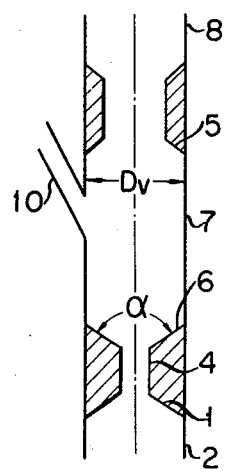
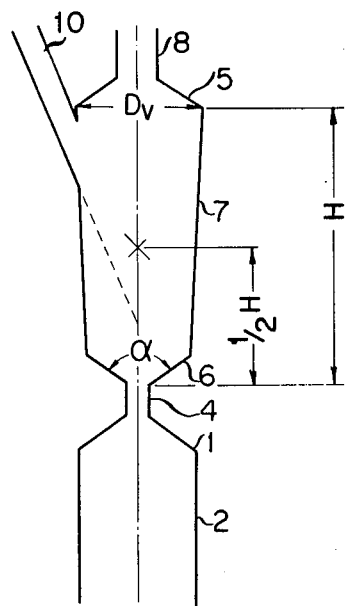

APPARATUS FOR CALCINING WET POWDERY GYPSUM

DETAILED DESCRIPTION OF INVENTION

This invention relates to an apparatus which produces calcined homogeneous gypsum by dispersing and conveying highly adhesive agglomerative wet powdery gypsum in a high temperature gaseous stream, without using a disintegrater, thereby to simultaneously dry and calcine.

Chemically by-produced gypsum obtained from the process for production of phosphoric acid and other various chemical reactions are usually in the form of wet powder, and have high adhesive, and coagulative properties. Therefore such gypsums are easily agglomerated and also adhere to transporting equipment and other equipment, causing various difficulties in operating and handling.

Heretofore, there has been provided an apparatus for calcining previously dried gypsum. Also, there has been provided a method for simultaneously drying and calcining wet gypsum, which comprises dispersing the gypsum in a gaseous stream after charging the gypsum into a disintegrater driven by mechanical force. However, the latter method is limited in the use of the disintegrater in a high temperature gaseous stream if the disintegrater is subject to damage by the high temperature.

We have carried out various tests with regard to a calcining apparatus, using a gaseous stream and without using a disintegrater, in which wet gypsum is directly supplied and calcined. As the result of these tests, we have found the following facts.

In cases where the calcining apparatus and the operating condition are not suitable, wet powdery gypsum directly supplied in a high temperature gaseous stream becomes agglomerative masses. Such masses run against the gaseous stream and are divided into small factions, but very few of these are dispersed into single particles and most of them form a small coagulated mass. The coagulated mass spins in accordance with the distribution of stream velocity and is formed into a ball. Even after the moisture is removed, such a ball is very difficult to disintegrate merely by conveying it in the gaseous stream. This is probably because the moisture contained in the coagulated ball evaporates from the surface of the ball in the early state of drying, and gypsum or impurities dissolved in the moisture are deposited simultaneously with the evaporation thereby strengthening the coagulating force among the particles in the surface portion of the ball.

The coagulated ball generally has a size of 10 mm or less in diameter, but the ball size and the amount of product can be decreased accordingly as the velocity of the gaseous stream in which the wet gypsum is dispersed and the temperature of the gaseous stream are increased. However, when the stream velocity is too high, the coagulated mass which is not yet well divided into small particles is also conveyed by the stream, and consequently an unequally calcined product is obtained. Also, in cases where the stream temperature is greatly increased, even if the average stream velocity is also greatly increased, the stream velocity in the vicinity of the wall of pipe is low enough to allow settling of a part of the gypsum supplied along the pipe wall, and the settled gypsum is melted by the heat of the stream and the pipe wall so that it adheres as it is deposited on the pipe wall. Such a deposit on the pipe wall increases as time passes.

Pure calcium sulfate has a melting point of around 1450° C, but most chemically by-produced gypsum which has impurities has a lower melting point and melts partially at a temperature of 900° to 1100° C.

Accordingly, when the gypsum is settled along the pipe wall and the having a temperature higher gaseous stream than the above-mentioned lower melting point is supplied, the melted gypsum adheres to the pipe wall to form a deposit on it. The resultant deposit on the pipe wall causes many difficulties in operating the apparatus. For example, it hinders the normal stream and the dispersion of gypsum as it is supplied, and consequently obstructs the uniform calcination of gypsum.

As described hereinbefore, in order to obtain uniformly calcined gypsum in the calcination of wet gypsum in a gaseous stream without using a disintegrater, well dispersed fine gypsum should be calcined by preventing the gypsum from melting and adhering to the pipe wall and by developing a high temperature and high velocity gaseous stream supply, thereby preventing the gypsum from coagulating and preventing the conveyance of coagulated gypsum or caked gypsum.

The apparatus of the present invention has been prepared for the purpose of overcoming the above-mentioned difficulties by taking the results of various tests into consideration.

Accordingly, the present invention provides an apparatus which is satisfactorily operated to produce uniformly-calcined gypsum.

The wet gypsum which can be satisfactorily calcined by the apparatus of this invention has 5 to 30%, and preferably 15 to 25% of moisture.

The present invention is illustrated by the following drawings.

FIG. 1 shows an embodiment of the present invention.

FIGS. 2 and 3 show applied examples of a vortex chamber which is the most important part of the apparatus of this invention.

As shown in FIG. 1, the apparatus of the present invention comprises: hot gas generating furnace 3 connected with straight cylindrical hot gas supply pipe 2 having tapered portion 1 at the upper part thereof; vortex chamber 7 having upper tapered portion 5 and lower tapered portion 6, the bottom of which is connected with said hot gas supply pipe 2 through high stream velocity pipe 4; heat transmission pipe 8 connected with the upper part of said vortex chamber 7; collector 9 connected with said heat transmission pipe 8; and gypsum supply pipe 10 connected with the side wall of said vortex chamber 7 and oriented to introduce gypsum into the vortex chamber 7 toward the bottom portion thereof and counter to the flow of gases therethrough.

The vortex chamber which is the most important part of the apparatus of this invention is described in more detail hereinafter.

When wet gypsum supplied to vortex chamber 7 through gypsum supply pipe 10 directly runs against the side wall of vortex chamber or lower tapered portion 6, the wet gypsum, being highly adhesive, adheres to the side wall of the vortex chamber or to the tapered portion and becomes an obstacle to the gaseous stream thus adversely affecting the normal function of the vortex chamber.

We have found on the basis of the above tests that in order to prevent the gypsum from adhering to the side wall of the vortex chamber, the gypsum supply pipe should be positioned in such a way that a projected extension of the lower edge of said gypsum supply pipe, following the same angle as that pipe, would intersect the center axis of the vortex chamber at a point higher than the bottom of the vortex chamber.

The function of the vortex chamber is to achieve the effective dispersion of supplied gypsum; to disintegrate agglomerated gypsum; to separate well-dispersed gypsum particles from agglomerated gypsum; to convey the dispersed gypsum particles to the heat transmission pipe 8, together with the gaseous stream; and to keep the caked or coagulated gypsum within the vortex chamber until they are fully disintegrated into dispersed fine particles.

As mentioned above, in order to effectively disperse gypsum, it is necessary to have the gypsum run against a high temperature and high velocity gas stream.

The test result shows that the diameter of the high stream velocity pipe 4 connected with the bottom of the vortex chamber should be determined so that the stream velocity in the pipe may become higher than 60 m/sec.

We have found that wet powdery gypsum containing 5 to 30%, and preferably 15 to 25% of moisture which is supplied to the vortex chamber is almost completely dispersed and uniformly calcined when a gas stream having a temperature higher than 900° C and a stream velocity in the range of from 60 to 150 m/sec, preferably 70 to 100 m/sec is passed through the high stream velocity pipe 4.

When partially agglomerated gypsum and wet powdery gypsum ore suplied and run against the above high temperature and high velocity gas stream, most of the coagulated gypsum is fully dispersed due to the explosive evaporation of moisture contained in the gypsum by the collision shock and rapid heat exchange between the gypsum and the gas stream, although a part of the coagulated gypsum is not fully dispersed.

The agglomerated gypsum which is not fully dispersed is not disintegrated simply by drying it in the gas stream, and it has been found effective to have the agglomerated gypsum particles collide with each other.

The above collision of the agglomerated gypsum is effected by forming a strong vortex in the vicinity of the central high velocity gas stream in the vortex chamber 7, which is introduced through the high stream velocity pipe 4. Accordingly, the divergence angle $\alpha$ of the lower tapered portion 6 must be sufficiently large so that the high velocity gas stream introduced into the vortex chamber through the high stream velocity pipe 4 may develop a diverging flow, while the divergence angle $\alpha$ must be determined so that the gypsum may not be deposited on the surface of the tapered portion 6.

It has been found that the divergence angle $\alpha$ is required to be within a range of 50° to 150° when the stream velocity is higher than 60 m/sec.

In order to separate dispersed gypsum from the agglomerated gypsum at the upper part of the vortex chamber, the stream velocity must be lowered. The test shows that the maximum diameter $Dv$ of the vortex chamber must be determined so that the average stream velocity may become 10 m/sec – 30 m/sec at the maximum diameter portion, when no gypsum is supplied. In order to avoid the extreme distribution of stream velocity at the maximum diameter portion, the maximum diameter portion should preferably be straight and cylindrical or else the upper part and the lower part of the maximum diameter portion should be gently tapered.

When the gypsum supply pipe 10 is positioned too high in the maximum diameter portion or the velocity of gas stream introduced from high stream velocity pipe 4 is too high, the agglomerated gypsum is not fully separated and conveyed toward the upper unit. In order to prevent this phenomenon, the stream velocity in the high stream velocity pipe 4 must be controlled at lower than 150 m/sec, and the vertical H between the bottom of the vortex chamber and the upper end of the maximum diameter portion must be more than 1.2 times bigger than the maximum diameter $Dv$, and the gypsum supply pipe 10 should be positioned in such a way that a projected extension of lower edge of said gypsum supply pipe, following the same angle as that pipe, would intersect the center axis of the vortex chamber at a point lower than $\frac{1}{2}$ H from the bottom of the vortex chamber.

The total height of the vortex chamber should be 5 to 6 times as large as the maximum diameter of the vortex chamber. It is preferable not to retain gypsum particles for an unnecessarily long time in a turbulent flow formed by charging gypsum in the vortex chamber since the uniform calcination of gypsum is disturbed, and so the total height of the vortex chamber, which has a relatively large diameter in order that the stream velocity may be low, should not be unnecessarily large.

The upper end of the vortex chamber which is connected with heat transmission pipe 8 has tapered portion 5 in order to prevent the formation of divagating or unstable flow in the heat transmission pipe, but the pipe 8 is not necessarily a straight cylinder, and as long as the uniform calcination of gypsum is carried out, the pipe 8 can be a diverging pipe or a converging pipe or a combination thereof to promote the heat exchange between the gas stream and the gypsum particles.

The length of heat transmission pipe 8 may vary depending on the shape of pipe 8, the shape of the vortex chamber, the moisture content of the supplied gypsum and the operating condition of the apparatus, but it is preferably more than 5 meters.

The falling of supplied gypsum into high stream velocity pipe 4 is almost prevented by a diverging upward flow from the bottom of the vortex chamber, which is produced by a high velocity gas stream, having a velocity of more than 60 m/sec in the pipe 4, being introduced into the vortex chamber. Even if a part of the supplied gypsum drops along the wall of pipe 4, the fallen gypsum particles are pushed up to the center of the gas stream by a converging flow produced by tapered portion 1 of hot gas supply pipe 2, and are returned into the vortex chamber. Accordingly, supplied gypsum does not adhere to the wall surface of the apparatus even when the temperature of the gas stream is higher than 900° C is supplied. Also, a divagating flow which may be present in the hot gas supply pipe can be controlled by tapered portion 1.

The present invention is further illustrated by the following Example.

EXAMPLE

The gypsum obtained from the process for waste gas desulfurization and gypsum by-produced in the process for production of phosphoric acid having a moisture content of 5 to 30% were placed in the apparatus shown in FIG. 1.

Varying the temperature of the supplied hot gas within a range of 900° to 1600° C and at an average gas stream velocity within a range of 60 m/sec to 150 m/sec in the high stream velocity pipe, the temperatures indicated by thermocouple thermometers mounted at every 1 m interval along the center axis of the heat transmission pipe 8 were measured. In addition to the temperatures, the remaining moisture content of gypsum collected by the suction type dust sampling units mounted at the same position as the above thermometers was measured.

These measurements showed that the remaining moisture content was 0.5 to 2.0% at the position of 5 m to 7 m up from the intersection of the extension of the center axis of the gypsum supply pipe and the center axis of the vortex chamber, and that the temperature indicated by the thermocouple thermometer at the same position was 190° to 300° C.

When gypsum is heated under atmospheric pressure, primary dehydration occurs at a temperature of 120° to 130° C, and secondary dehydration occurs at a temperature of about 170° C. Once the dehydration starts, the rising rate of the temperature of gypsum becomes low in comparison with that before dehydration, but its rate becomes high again after the dehydration finishes.

Gypsum particles conveyed in a high temperature gas stream are heated by the heat-exchange between the particles and the gas stream, and the evaporation of the moisture contained in the gypsum, the primary dehydration and the secondary dehydration occurs in sequence, thereby forming soluble gypsum anhydride. Finally the particles and the gas stream reach an equilibrium temperature.

Temperature indicated by a thermometer is measured in the mixed phase of gas and gypsum particles, but the temperature indicated is closer to that of the gas at first and the measured temperature of the particles corresponds to that of the gas when the particles and the gas reach an equilibrium temperature.

Accordingly, when the heat transmission pipe is long enough to allow gas and gypsum particles to reach an equilibrium temperature and the temperature indicated by a thermometer is higher than the temperature at which the secondary dehydration is completed, the calcination of gypsum is accomplished. However, when caked or agglomerated gypsum having a big apparent particle size is present in the supplied gypsum, the temperature measured at the end of the heat transmission pipe should be higher than the temperature at which well dispersed gypsum particles are calcined.

It is preferable, in obtaining high quality calcined gypsum, that the supplied gypsum should be completely calcined until soluble gypsum anhydride is obtained, and subsequently that the gypsum anhydride should be changed into gypsum hemihydrate by aging. If any gypsum dihydrate remains, the quality of the product is severely damaged.

According to X-ray diffraction analysis, the gypsum product obtained at the position of 5 m to 7 m up from the cross point of the extension of center axis of the gypsum supply pipe and the center axis of the vortex chamber in the above Example was proved to be a mixture of soluble gypsum anhydride and gypsum hemihydrate, and no gypsum dihydrate remained at all.

The apparatus of this invention is useful also in drying wet gypsum.

What we claim is:

1. An apparatus for calcining wet powdery gypsum having a moisture content of about 5 to about 30% which comprises:
   (a) a furnace which generates a hot gas having a temperature higher than about 900° C;
   (b) a straight cylindrical hot gas supply pipe connected with the gas outlet of said furnace and having a tapered upper portion;
   (c) a straight cylindrical high stream velocity pipe connected with the tapered portion of said hot gas supply pipe and dimensioned to develop a gas velocity in said high stream velocity pipe within the range of from about 60 m/sec to about 150 m/sec;
   (d) a substantially vertical vortex chamber connected with the upper part of said high stream velocity pipe and which chamber has a diameter at a middle cylindrical portion greater than that of said high stream velocity pipe and a maximum diameter determined so that the gas velocity at the portion of maximum diameter is within the range of from about 10 m/sec to 30 m/sec when no gypsum is supplied thereto, and which has conically tapered portions both at the top and bottom of said cylindrical portion, the bottom tapered portion converging downwardly toward and connected with the upper part of said high stream velocity pipe and having an angle of convergence within the range of about 50° to 150°, the top tapered portion comprising the vortex chamber gas outlet, and the length of said vortex chamber being more than 1.2 times longer than said maximum diameter;
   (e) a wet powdery gypsum supply pipe connected with the side wall of said vortex chamber, said gypsum supply pipe being connected in such a way that a projected extension of the lower edge of said gypsum supply pipe, following the same angle as that pipe, would intersect the center axis of said vortex chamber at a point higher than the bottom of said vortex chamber and lower than one half the distance from the bottom to the top of said vortex chamber, and said gypsum supply pipe being oriented to introduce gypsum into said vortex chamber toward said bottom portion thereof and counter to the flow of gases therethrough;
   (f) a heat transmission pipe connected with the gas outlet of said vortex chamber for flowing therethrough gas and calcinated gypsum with sufficiently low heat loss, and being of sufficient length, to effect substantially complete secondary dehydration of the calcinated gypsum while the calcinated gypsum is transported through the heat transmission pipe by the gas; and
   (g) a gypsum collector connected with said heat transmission pipe.

2. An apparatus for calcinating wet powdery gypsum comprising:
   (a) a substantially vertical vortex chamber comprising a hollow cylindrical portion having a central longitudinal axis, a conical lower end portion having an angle of convergence from about 50° to about 150° and converging in a downward direction away from said cylindrical portion to define a gas inlet, and a conical upper end portion converging in an upward direction away from said cylindrical portion to define a gas outlet;
   (b) means for developing and for introducing a hot gas stream having a temperature greater than about 900° C through said gas inlet at a velocity from about 60 m/sec to about 150 m/sec;

(c) means for introducing gypsum into said vortex chamber in a direction toward said gas inlet and counter to the flow of said hot gas stream which direction intersects the central longitudinal axis at a point between said gas inlet and half the distance between said gas inlet and the upper end of said cylindrical portion;

(d) means defining a conduit connected to said gas outlet for flowing gas and calcinated gypsum discharged through said gas outlet from said vortex chamber with sufficiently low heat loss, and being of sufficient length, to effect substantially complete secondary dehydration of the calcinated gypsum while the calcinated gypsum and gas flow through said means defining a conduit; and (e) means connected to said means defining a conduit for collecting the discharged calcinated gypsum.

3. An apparatus according to claim 2 wherein the length to diameter ratio of said vortex chamber is greater than 1.2.

* * * * *